US008394235B2

(12) United States Patent
Bradt et al.

(10) Patent No.: US 8,394,235 B2
(45) Date of Patent: *Mar. 12, 2013

(54) REMOVAL OF INHIBITORY COMPOUNDS DURING PRE-TREATMENT OF LIGNOCELLULOSIC BIOMASS

(75) Inventors: Christopher Bruce Bradt, LaSalle (CA); Richard Romeo Lehoux, Windsor (CA)

(73) Assignee: GreenField Ethanol Inc., Toronto, Ontario (CA)

( * ) Notice: Subject to any disclaimer, the term of this patent is extended or adjusted under 35 U.S.C. 154(b) by 322 days.

This patent is subject to a terminal disclaimer.

(21) Appl. No.: 12/688,342

(22) Filed: Jan. 15, 2010

(65) Prior Publication Data

US 2010/0181034 A1 Jul. 22, 2010

Related U.S. Application Data

(60) Provisional application No. 61/145,328, filed on Jan. 16, 2009.

(51) Int. Cl.
*D21C 1/02* (2006.01)
*D21C 1/04* (2006.01)

(52) U.S. Cl. ............. 162/68; 162/19; 162/63; 127/37

(58) Field of Classification Search ............ 162/19, 162/41, 63, 68
See application file for complete search history.

(56) References Cited

U.S. PATENT DOCUMENTS

| 3,939,286 A | 2/1976 | Jelks |
| 4,136,207 A | 1/1979 | Bender |
| 4,461,648 A | 7/1984 | Foody |
| 5,424,417 A * | 6/1995 | Torget et al. .............. 536/56 |
| 5,628,830 A | 5/1997 | Brink |
| 6,090,595 A | 7/2000 | Foody et al. |
| 6,419,788 B1 | 7/2002 | Wingerson |
| 6,878,212 B1 * | 4/2005 | Pinatti et al. .............. 127/1 |
| 7,815,741 B2 | 10/2010 | Olson |
| 2008/0044877 A1 | 2/2008 | Penttila et al. |
| 2009/0023187 A1 | 1/2009 | Foody et al. |
| 2009/0221814 A1 | 9/2009 | Pschorn et al. |
| 2010/0065128 A1* | 3/2010 | Benson et al. .............. 137/2 |

FOREIGN PATENT DOCUMENTS

| CA | 2464090 | 5/2003 |
| WO | 0214598 A1 | 2/2002 |

OTHER PUBLICATIONS

International Patent Application No. PCT/CA2010/000051, Search Report dated Mar. 16, 2010.
Canadian Patent Application No. 2,738,886, Office Action dated Aug. 3, 2011.
MacMillan. "Hemicellulose conversion to Ethanol", Handbook on Bioethanol: production and utilization, C. Wyman, Editor, Taylor and Francis, Washington DC, Jul. 1, 1996, p. 287-313.
Badal, C.S., "Hemicellulsoe Bioconversion", J. Ind. Microb. Biotechnol., 30/5, Available Online Apr. 16, 2003 279-291.
Walther, T. et al., "The influence of aeration and hemicellulose sugars on xylitol production by *Candida tropicalis*". Biores. Technol. 7613, Available Online Oct. 2000, p. 213-220.

(Continued)

*Primary Examiner* — Anthony Calandra
(74) *Attorney, Agent, or Firm* — Borden Ladner Gervais LLP

(57) ABSTRACT

A process for the pretreatment of lignocellulosic biomass, in particular during the production of ethanol from biomass. The process including a cooking step where the biomass is exposed to steam at elevated temperatures and pressures for a preselected period of time in a treatment vessel. During the process, volatile and liquid compounds are purged from the treatment vessel.

25 Claims, 1 Drawing Sheet

OTHER PUBLICATIONS

Clarke, A.J., "Chemistry and structure of cellulose and heteroxylan. In Biodegradation of cellulose: Enzymology and Biotechnology". Lancaster, Pa: Technomic Press, 1996, p. 9.

Torget, R. et al., "Dilute-acid pretreatment of corn residues and short rotation woody crops". Appl. Biochem. Biotechnol., 34/35, The Human Press Inc., 1991, 75-86.

Torget, R. et al., Dilute-acid pretreatment of two short-rotation herbaceous crops. Appl. Biochem. Biotechnol., 34/35, The Human Press Inc., 1992, p. 115-123.

Rydholm, S.A. 1965. "Pulping Processes", Wood Chemistry. Interscience Publisher, NY., 1965, p. 95-96.

Ruzene, D.S. et al. "Hydrothermal treatments of corn cobs and hemicellulose extraction", In Proceedings of the 10th International Chemical and Biological Engineering Conference, CHEMPOR 2008. E.C. Ferreira and M. Mota eds. Braga, Portugal, Sep. 4-6, 2008.

Garrote, G. et al., "Mild autohydrolysis : an environmentally friendly technology for xylooligosaccharide from wood". J. Chem. Technol. Biotechnol, 74, Available Online Oct. 21, 1999, p. 1101-1109.

Vasquez, M.J. et al., "Enhancing the potential of oligosaccharides from corncob autohydrolysis as prebiotic food ingredient". Industrial Crops and products, 24, Available Online Jun. 2, 2006, p. 152-159.

Moura, P. et al. "In vitro fermentation of xylo-oligosaccharides from corn cobs autohydrolysis by Bifidobacterium and Lactobacillus strains". Swiss Society of Food and Science Technology, Available Online Oct. 2, 2006, LWT 40, p. 963-972.

Garrote, G. et al.,"Kinetic modelling of corncob autohydrolysis". Proc. Biochem., 36, Available Online Jan. 11, 2001, p. 571-578.

Garrote, G. et al., "Autohydrolysis of corncob: study of non-isothermal operation for xylooligosaccharide production". J. Food. Eng., 52, Available Online Feb. 21, 2002, p. 211-218.

Aoyama, M. "Steaming treatment of bamboo grass". Characterization of solubilised hemicellulose and enzymatic digestibility of water extracted residue. Cellulose Chemistry and Technology, 30, 1996, p. 385-393.

Carvalheiro F. et al. "Production of oligosaccharides by autohydrolysis of brewery's spent grain". Bioressource Technology, 91, Available Online Jul. 16, 2003, p. 93-100.

Gans, I. et al., "Process Development for Plug Flow Acid Hydrolysis and Conversion of Lignocellulosics to Ethanol". In Bioenergy: Proc 7th Can. Bioenergy R&D Semina, E. Hogan, ed., NRC Canada, 1989, p. 419-423.

Lawford, H.G. et al., "Effect of Acetic Acid on Xylose Conversion to Ethanol by Genetically Engineered *E. coli*". Appl. Biochem. Biotechnol. The Human Press Inc., 34/35, 1992, p. 185-204.

Ferrari, M.D. et al., "Ethanol Production From Eucalyptus Wood Hemicellulose Hydrolyzate by *Pichia stipitis*". Biotech. Bioeng, 40, Available Online Feb. 19, 2004, p. 753-759.

Lawford, H.G. et al.,"Effect of pH and Acetic Acid on Glucose and Xylose Metabolism by a Genetically Engineered Ethanologenic *Escherichia coli*". Appl. Biochem. Biotechnol., 39/40, 1993, p. 301-322.

McMillan, J.D. 1994. "Conversion of Hemicellulose Hydrolyzates to Ethanol". Enzymatic Conversion of Biomass for Fuels Production. M.E. Himmel, J.O. Baker and R.P. Overend, eds., ACS Symposium Seried 566, American Chemical Society, pp. 411-437.

Narendranath, N.V. et al.,"Acetic Acid and Lactic Acid Inhibition of Growth of *Saccharomyces cerevisiae* by Different Mechanisms". J. Am. Soc. Brew. Chem., 59/4, 2001, p. 187-194.

Narendranath, N.V. et al., "Effects of acetic acid and lactic acid on the growth of *Saccharomyces cerevisiae* in a minimal medium". Journal of industrial microbiology and Biotechnology, 26/3, 2001, p. 171-177.

Kuyper, M. et al., "Minimal metabolic engineering of *Saccharomyces cerevisiae* for efficient anaerobic xylose fermentation: a proof of principle". FEMS Yeast Res., 4, Available Online Jan. 9, 2006, p. 655-664.

Krisch, J. et al., "Ethanol and acetic acid tolerance in free and immobilized cells of *Saccharomyces cerevisiae* and *Acetobacter aceti*". Biotechnology Letters, 19/6, 1997, p. 525-528.

Pampulha, M.E. et al. "Activity of glycolytic enzymes of *Saccharomyces cerevisiae* in the presence of acetic acid. Appl. Microbiol. Biotechnol", 34, Available Online Aug. 10, 1990, p. 375-380.

Thomas, K. C. et al."Influence of Medium Buffering Capacity on Inhibition of *Saccharomyces cerevisiae* Growth by Acetic Acid and Lactic Acids". Appl. Environ. Microbio, 68, Available Online, Apr. 2002, p. 1616-1623.

Graves, T. et al.,"Effects of pH and lactic or acetic acid on ethanol productivity by *Saccharomyces cerevisiae* in corn mash". Appl. Microbiol. Biotechnol, 33, 2006, p. 469-474.

\* cited by examiner

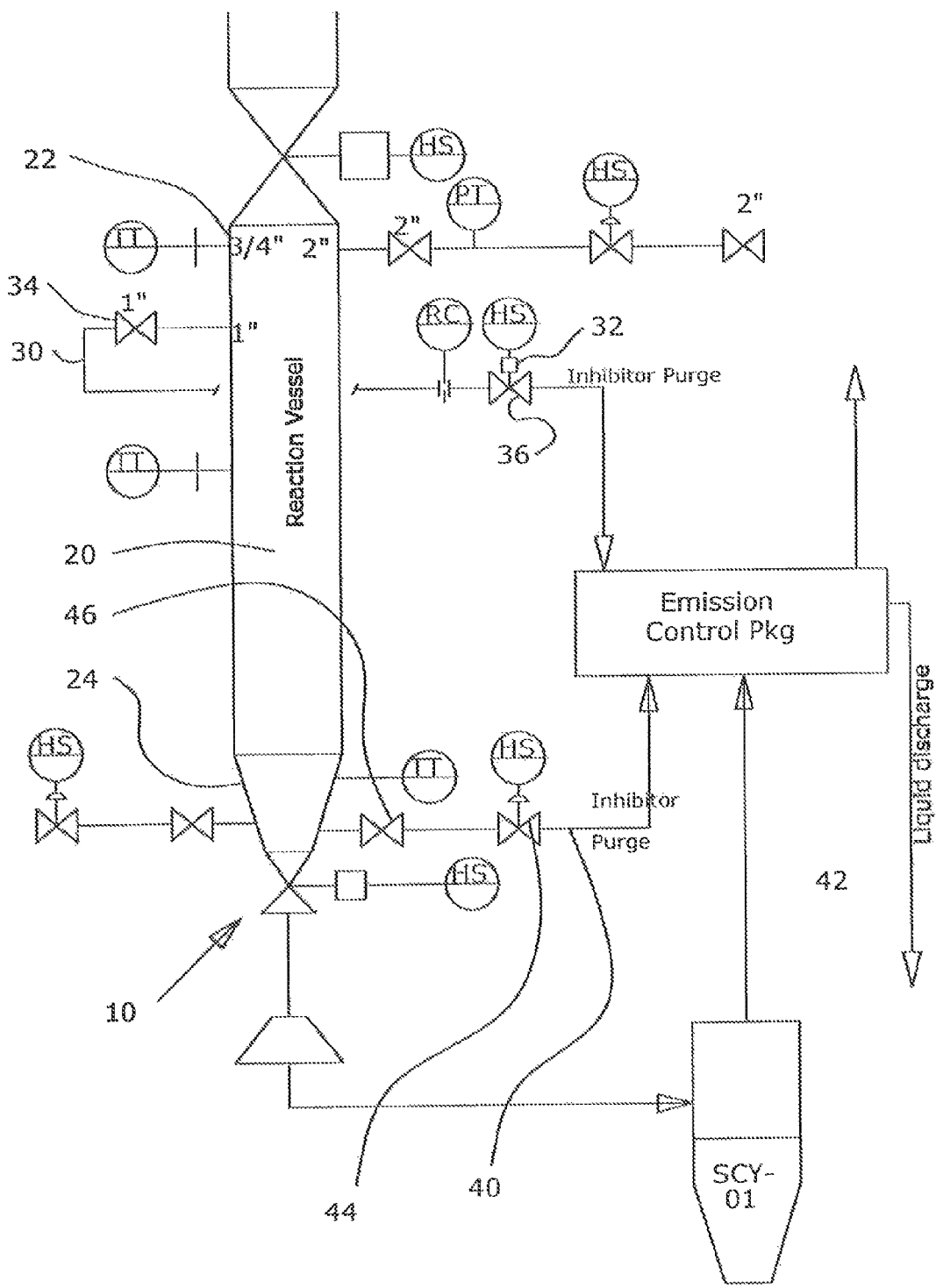

REMOVAL OF INHIBITORY COMPOUNDS DURING PRE-TREATMENT OF LIGNOCELLULOSIC BIOMASS

CROSS REFERENCE TO RELATED APPLICATIONS

This application claims the benefit of priority of U.S. Provisional Patent Application No. 61/145,328 filed Jan. 16, 2009, which is incorporated herein by reference in its entirety.

FIELD OF THE INVENTION

The invention relates to the production of alternate fuels from biomass, in particular ethanol produced from biomass.

BACKGROUND OF THE INVENTION

Due to the rapidly rising price of fossil fuels and a growing desire to reduce the environmental impact of non-renewable fuels, ethanol has become a significant part of the transportation fuel mix. Ethanol made by fermentation of plant derived starches and sugars is considered to have a lower environmental impact than fossil fuels.

Ethanol is usually produced from starch or sugar by fermentation. In North America the feedstock is primarily corn. There are disadvantages to using potential food or feed plants to produce fuel. Moreover, the availability of such feedstock is limited by the overall available area of suitable agricultural land.

To reduce the amount of food or feed plants in ethanol production, many alternate feedstocks have been proposed, among them lignocellulosic biomass. This includes cellulose containing agricultural and wood residues, purpose grown non-food crops, and a wide variety of biodegradable wastes.

Agricultural and wood residues and non-food crops have several economic and environmental advantages over corn and starch. Furthermore, some alternative crops such as *Miscanthus*, Switchgrass and hybrid Poplar can even grow on poor quality land not suitable for corn. Wood and agricultural residues have relatively low market value and have the potential to be high volume renewable feedstocks for ethanol production.

Lignocellulosic biomass is composed of three major polymers: cellulose, hemicellulose and lignin. Cellulose makes up 40% to 60% of lignocellulosic biomass and is the desired target for ethanol production. Cellulose resembles starch in many ways. It is a homogeneous polymer made of linked glucose monomers, as is starch. Cellulose, however, is much more difficult to depolymerize than starch. This is due to a difference in the nature of the glucose linkages as well as the presence of hemicellulose and lignin. As a result, more severe conditions are needed to hydrolyze cellulose to glucose than are needed to hydrolyze starch.

The challenge in the production of fuels from biomass is to remove the non-cellulosic components of the biomass to make subsequent treatment easier at lower capital and operating costs.

One process for converting lignocellulosics to ethanol can be called the enzymatic hydrolysis process. This process requires five major unit operations: feed preparation, pretreatment, enzymatic hydrolysis, fermentation and distillation. Lignocellulosic biomass is chopped, cleaned, and ground to the desired size.

Pretreatment of the biomass opens up its structure, exposing the cellulose to the hydrolytic action of enzymes in the hydrolysis step. Pretreatment also increases the concentration of cellulose in the prehydrolysate, which improves the digestibility of the cellulose by enzymes.

In the enzymatic hydrolysis step, the prehydrolysate obtained in the pretreatment step is cooled to about 40° C. to 60° C., cellulase enzymes are added and the hydrolysis is allowed to continue to achieve the desired conversion of cellulose to glucose. Fermentation of the sugars in the hydrolysate by yeast is the next step.

In the final step, ethanol is recovered by distillation of the fermented mash and dehydration of ethanol to the desired concentration. Many different configurations for this step are practiced in the industry.

Lignocellulosic biomass contains a variety of chemicals and polymers which reduce access to the cellulose molecule.

Lignin is a potent inhibitor of hydrolysis and some soluble lignin derivatives inhibit the fermentation process. Thus, it is desirable to use a lignocellulosic feedstock which is low in lignin. The lignin content of corncobs, (less than 8% by weight) is low, which would make this a good biomass feedstock for the production of ethanol. However the hemicellulose content of corncobs is high, almost 30% of the total dry matter. Moreover, much of the hemicellulose is acetylated. The dissolution of hemicellulose leads to the formation of acetic acid, a powerful inhibitor of the yeast fermentation process used to produce ethanol. This is a problem, since the acid remains in the pretreated biomass and carries through to the hydrolysis and fermentation steps.

Many of the compounds released in the pretreatment step, such as acetic acid, hemicellulose and many hemicellulose degradation products are also inhibitors of and retard the downstream fermentation process. This results in increased capital equipment costs for removal of the inhibitory compounds and frequently incomplete conversion of the glucose to ethanol. Therefore, it would be desirable to remove these inhibitory compounds prior to the enzymatic hydrolysis step.

In known pretreatment processes, acidic solutions, for example mineral acids such as sulfuric acid, or alkaline solutions are added to the biomass for hydrolysis of the biomass components. This chemical treatment is disadvantageous since large amounts of water are required to flush the treatment chemicals from the pretreated cellulose prior to the enzymatic hydrolysis and fermentation steps.

In an alternate approach, a steam gun cellulose pretreatment is used. Biomass ground to the desired size is subjected to steam under pressure and at elevated temperatures. The pressure is then released rapidly by way of a fast acting valve, leading to an explosion of the cooked biomass material. This process does not require the addition of chemical processing agents, but depending on the process conditions will produce significant amounts of undesirable by-products which are detrimental to the downstream hydrolysis and fermentation steps.

It is a challenge of the enzymatic hydrolysis process to operate the process at the most optimal conditions for the respective feedstock used. Strong pretreatment conditions would appear desirable to unlock as much of the cellulose as possible and hydrolyze as much of the hemicellulose as possible. Aggressive pretreatment conditions (higher heat for longer duration) release more acetic acid especially when feedstocks with high acetylated hemicellulose content are used, such as corncob. This elevated acetic acid content accelerates the hemicellulose breakdown by autohydrolysis. However, an elevated acetic acid content significantly retards the fermentation of glucose to ethanol and may even result in incomplete fermentation. Other hemicellulose degradation products generated also inhibit fermentation and may even interfere with cellulose hydrolysis by crystallizing on and effectively capping the cellulose fibers, making them inaccessible to enzymatic hydrolysis. Thus, a process is desired which removes an amount of inhibitory compounds in the pretreated cellulose stream, in order to enhance the digestibility of the cellulose in the enzymatic hydrolysis and improve the efficiency of the conversion of glucose to ethanol in the fermentation step.

SUMMARY OF THE INVENTION

It is now an object of the present invention to provide a process which overcomes at least one of the above disadvantages.

It is another object to provide a cellulose pretreatment process wherein the amount in the prehydrolysate of inhibitors of the downstream hydrolysis and fermentation processes is reduced.

The inventors have now surprisingly discovered that the amount of inhibitory compounds in the prehydrolysate are reduced by controlling the operating conditions in a modified batch pretreatment process.

In one aspect, the invention provides a process for the pretreatment of lignocellulosic biomass, which includes a cooking step wherein corncob is exposed to steam at elevated temperatures for a preselected amount of time and during which time purge streams are systematically operated to remove inhibitory compounds. The cooking step is carried out at a temperature of 190-220 degrees C. and at a residence time of 5 to 15 minutes. Preferably, the exposing step is carried out at a temperature of 203 to 207 degrees C., most preferably 205 degrees C., a pressure of 220 to 250 psi, most preferably 235 psig and for a treatment time of 7 to 9 minutes, most preferably 8 minutes. The corncob biomass is preferably chopped or ground prior to the exposure step to a particle size of 0.5 to 1 $cm^3$.

The process preferably includes the step of volatiles purging wherein volatile components are removed at preselected times and for preselected durations. The volatiles purging can take place at any location above the solids fill in the treatment vessel. In a steam gun application, this would mean that the volatiles purge can be located anywhere in the top half of the steam gun. The volatiles purging step is carried out after steam is introduced into the steam gun and is maintained for a period of time up to and including the full duration of steam introduction. This volatiles purging preferably removes from the treatment vessel air and volatile inhibitory compounds generated during the pretreatment process. Preferably, the purging step is commenced once the steam gun has reached a pressure of 50 to 200 psig, most preferably at 100 psig. The purging step is preferably maintained for a duration of 20 to 600 seconds, most preferably at 120 seconds. The volatiles purging preferably removes the volatiles at or near the top of the steam gun.

The process also preferably includes the step of liquid purging at precise times and for precise durations. The liquid purging is preferably commenced after a preselected delay period after treatment vessel pressurization, and then maintained as such for a period of time up to and including the full duration of the pretreatment cook. The liquid purging preferably removes liquids that contain inhibitory compounds generated during the pretreatment process. The liquid purging is preferably commenced after a delay of 10 to 300 seconds, most preferably after a delay of 60 seconds from the start of steam injection into the steam gun. The liquid purging is preferably maintained for a duration of 20 to 600 seconds, most preferably at 380 seconds. The liquid purging preferably removes the liquids at or near the bottom of the steam gun.

The apparatus for carrying out the process of the invention in one embodiment includes a steam gun with a pressurization vessel and a volatiles purge line for removing volatile compounds from the vessel. The volatiles purge line is preferably located at or near the top of the pressurization vessel, but can be located at any vertical position at which removal of the volatiles in the vessel is not impeded by the solids fill in the vessel or any liquids which may accumulate in the vessel. This volatiles purge line can be opened at preselected times and for a preselected duration. The purge line is opened after steam is introduced into the steam gun and is maintained open for a period of time up to and including the full duration of steam introduction. The top purge line preferably discharges air and volatile inhibitory compounds generated during the pretreatment process. Preferably, the top purge line is opened once the steam gun has reached a pressure of 50 to 200 psig, most preferably at 100 psig. The top purge line is maintained open for a duration of 20 to 600 seconds, most preferably at 120 seconds.

The apparatus for carrying out the process of the invention also preferably includes a liquids purge line for removal of liquids from the vessel. The liquids purge line is preferably located at the bottom of the pressurization vessel, but can be positioned at any location which permits removal of liquids that accumulate in the vessel. The liquids purge line is preferably opened at precise times and for precise durations. The liquids purge line is preferably opened after a prescribed delay period after steam gun pressurization, and then maintained as such for a period of time up to and including the full duration of the pretreatment cook. The liquids purge line preferably discharges liquids that contain inhibitory compounds generated during the pretreatment process. Preferably, the liquids purge line is opened after a delay of 10 to 300 seconds, most preferably after a delay of 60 seconds. The liquids purge line is preferably maintained open for a duration of 20 to 600 seconds, most preferably at 380 seconds.

The volatiles and liquids removal rate is preferably controlled such that the pressure in the steam gun does not fall below a preselected threshold level. This is preferably achieved through selection of the size of the purge lines and/or control of the flow through the purge lines. Preferably, the volatiles purge line has a restrictive orifice that limits the flow rate of steam and volatiles out of the steam gun. This orifice is sized such that the flow rate preferably does not exceed 10% of the steam supply rate to the steam gun. Preferably, the liquid purge rate is controlled using a variable area control valve that is adjusted or controlled to a preselected mass flow rate of condensate. The condensate flow rate is preferably also controlled so as to not exceed 10% of the steam supply rate to the steam gun. Thus, the process of the invention is controlled and the apparatus of the invention constructed in such a manner that the required level of pressurization for the biomass pretreatment in the steam gun is maintained while the volatiles and/or liquids purging are going on. This is preferably achieved by using a steam supply line of sufficient size to supply enough steam to compensate for and preferably exceed the volatile and liquid purge volumes.

In one aspect, the present invention resides in a process for pretreatment of a lignocellulosic biomass, comprising the steps of: exposing the lignocellulosic biomass to steam in an exposing step in a treatment vessel at an elevated temperature and an elevated pressure for a preselected exposure time; and purging inhibitory compounds from the treatment vessel at user selected times.

BRIEF DESCRIPTION OF THE DRAWINGS

Other objects and advantages of the invention will become apparent upon reading the detailed description and upon referring to the drawings in which:

FIG. 1 is a schematic process diagram of the cellulose batch pretreatment device in accordance with the invention.

DETAILED DESCRIPTION OF PREFERRED EMBODIMENTS

Before explaining the present invention in detail, it is to be understood that the invention is not limited to the preferred embodiments contained herein. The invention is capable of other embodiments and of being practiced or carried out in a variety of ways. It is to be understood that the phraseology and terminology employed herein are for the purpose of description and not of limitation.

The invention is directed to ethanol from biomass processes and especially to cellulose pretreatment processes. In particular, the invention is directed to processes intended to reduce the amount of hemicellulose and acetic acid in the cellulose hydrolysis feed stream when lignocellulosic biomass is used. In particular corncob, is used as the starting material.

Hemicellulose is a heteropolymer or matrix polysaccharide present in almost all plant cell walls along with cellulose. While cellulose is crystalline, strong, and resistant to hydrolysis, hemicellulose has a random, amorphous structure with little strength. Hydrolysis of hemicellulose can be relatively easily achieved with acids or enzymes. Hemicellulose contains many different sugar monomers. For instance, besides glucose, hemicellulose can include xylose, mannose, galactose, rhamnose, and arabinose. Xylose is the monomer present in the largest amount.

While cellulose is highly desirable as a starting material for enzymatic ethanol production, hemicellulose and its hydrolytic degradation products interfere with the enzymatic hydrolysis of cellulose and the downstream fermentation of glucose from cellulose. Especially xylose derivatives and degradation products, and acetic acid, all of which are products of hemicellulose hydrolysis, are inhibitors of glucose fermentation.

A preferred aspect of the invention is a process for the pretreatment of lignocellulosic biomass for generating a cellulose prehydrolysate with reduced impurities and content of substances deleterious to the downstream hydrolysis and fermentation steps.

In a preferred embodiment, the process includes the step of purging, during batch or continuous processing treatment, volatile and/or liquid components from the treatment vessel at preselected times and for preselected durations. Many of the impurities and substances deleterious to the downstream hydrolysis and fermentation steps are removed in the volatiles and liquids streams removed during the purging step.

A volatiles purging step is carried out after steam is introduced into the treatment vessel and is maintained for a period of time up to and including the full duration of steam introduction. This volatiles purging preferably removes from the air and volatile inhibitory compounds generated during the pretreatment process.

In one embodiment, the process is carried out in a batch pretreatment device as illustrated in FIG. 1, wherein the pretreatment and purging is achieved with a Steam Gun 10 and an upstream treatment or pressurization vessel 20. The volatiles purging step is commenced once the steam gun 10 has reached a pressure of 50 to 200 psig, most preferably at 100 psig. The volatiles purging step is preferably maintained for a duration of 20 to 600 seconds, most preferably 120 seconds. The volatiles purging removes the volatiles above the solids fill in the treatment vessel 20, preferably at or near the top 22 of the treatment vessel 20 upstream of the steam gun 10.

The process also preferably includes a liquid purging step at precise times and for precise durations. The liquid purging is preferably commenced after a preselected delay period subsequent to the commencement of steam gun pressurization, and then maintained as such for a period of time up to and including the full duration of the pretreatment cook. The liquid purging preferably removes liquids that contain inhibitory compounds generated during the pretreatment process. The liquid purging is preferably commenced after a delay of 10 to 300 seconds, most preferably after a delay of 60 seconds from the start of steam injection into the steam gun 10. The liquid purging is preferably maintained for a duration of 20 to 600 seconds, most preferably 380 seconds. The liquid purging preferably removes the liquids at or near a lowest point in the bottom 24 of the pressurization vessel 20 upstream of the steam gun 10 at which the liquids accumulate under gravity.

The apparatus for developing and carrying out the process of the invention in the example is a modified conventional steam gun construction including commercially available components, such as the pressurization vessel 20 and various conduits and controls for the supply of the steam gun charge or fill, steam and possibly reagents into the treatment vessel. The apparatus further preferably includes a volatiles purge line 30 and controls 32 for removing volatile compounds from the vessel 20 at preselected times and at preselected flow rates. The volatiles purge line 30 is preferably located at or near the top 22 of the pressurization vessel 20, but can be located at any vertical position at which removal of the volatiles in the vessel is not impeded by the solids fill in the vessel or any liquids which may accumulate in the vessel 20. In the example, the volatiles purge line 30 is a 1", 316 stainless steel pipe welded to the pressurization vessel 20 at 26" from the top 16 of the steam gun. Flow through the volatiles purge line 30 is controlled by valves 34, 36 (for example 1" W47P-666MKG-SW Habonim ball valve suitable for 400 psi saturated steam with double acting solenoid actuator), which can be opened at preselected times and for a preselected duration by way of a PLC control (not shown). The purge line 30 is opened after steam has been introduced into the steam gun 10 and is maintained open for a period of time up to and including the full duration of steam introduction. The volatiles purge line 30 preferably discharges air and volatile inhibitory compounds generated during the pretreatment process. The flow through the volatiles purge line 30 is closely monitored and controlled to prevent a reduction of the pressure in the treatment vessel below a desired threshold level required for pretreatment of the lignocellulosic charge in the treatment chamber. Preferably, the volatiles purge line 30 is opened once the steam gun has reached a pressure of 50 to 200 psig, most preferably at 100 psig. The volatiles purge line 30 is maintained open for a duration of 20 to 600 seconds, most preferably 120 seconds.

The apparatus for carrying out the process of the invention in the example also preferably includes a liquids purge line 40 for the removal of liquids from the vessel 20. The liquids purge line 40 is preferably located at the bottom 24 of the pressurization vessel 20, but can be positioned at any location which permits removal of liquids that accumulate in the vessel. In the preferred embodiment, the liquids purge line 40 is 1", 316 stainless steel pipe welded to the pressurization vessel 12" from the bottom. The flow through the liquids purge line 40 is controlled by valves 44, 46 (for example 1" N47P-

666MKG-SW-V30 Habonim control ball valve suitable for 400 psig saturated steam with a double acting pneumatic positioner actuator) which can be opened at preselected times, to a specific valve opening and for a preselected duration by way of a PLC control (not shown). The liquids purge line 40 is preferably opened at precise times and for precise durations. The liquids purge line 40 is preferably opened after a prescribed delay period after steam gun pressurization, and then maintained as such for a period of time up to and including the full duration of the pretreatment cook. The liquids purge line 40 preferably discharges liquids that contain inhibitory compounds generated during the pretreatment process. The flow through the liquids purge line 40 is closely monitored and controlled to prevent a reduction of the pressure in the treatment vessel below a desired threshold level required for pretreatment of the lignocellulosic charge in the treatment chamber 20. Preferably, the liquids purge line 40 is opened after a delay of 10 to 300 seconds, most preferably after a delay of 60 seconds. The liquids purge line 40 is preferably maintained open for a duration of 20 to 600 seconds, most preferably 380 seconds.

In the preferred steam gun construction, all valves were Habonim ball valves with either electronic Automax solenoid control or Automax electro pneumatic positioner control. Temperature and pressure transmitters were electronic Endress & Hauser devices. All electronic devices were connected to and controlled by an Allen Bradley Control Logix processor. The volatiles restrictive orifice was designed to purge 40 kg/hr of steam and the liquid purge is operator adjusted to purge a volume of between 250 to 1000 ml for the complete purge cycle.

For clarity, it is to be appreciated that the invention is not limited to pretreatment of a lignocellulosic biomass in a batch using a steam gun apparatus. Rather, it is contemplated that the steps of purging and venting volatiles and liquids also applies to other types of pretreatment, including more mechanically complex continuous pre-treatment systems.

Example

The impact of purging and venting hemicellulose and hemicellulose degradation products during steam explosion pre-treatment was demonstrated with corncobs.

Pre-treatment of one metric tonne of corn cob pre-hydrolysates was carried out in a treatment vessel with the liquid purge and air vent open during the heat treatment. Pre-treatment in the treatment vessel was carried out at 205° C. for 8 minutes with batches or "cooks" of 9 kg of corn cobs (40% to 45% DM). An average of 7 liters of condensed vapors and 10 liters of drained liquid were collected during pre-treatment for each 9 kg batch of corn cob pre-hydrolysate. Unexploded prehydrolysates (~30% DM) were collected at atmospheric pressure.

The following results were observed, and where weights are referred to, they are reported as kilograms of dry matter.

Out of one metric tonne of dry corn cob pre-hydrolysate material, an average of 98.5 kg of hemicellulose degradation product (i.e. toxic compounds) was purged or vented during the heat treatment.

54 kg of furfural, 43 kg of acetic and 1.5 kg of HMF were removed from the treatment vessel during the exposing step.

Two thirds of the acetic acid and 90% of the furfural produced was purged from the pre-treatment system through the venting and drain lines.

The quantity of acetic acid captured in the vapor phase (vented steam), the liquid drainage and in the wet fraction of corn cob prehydrolysates were similar.

About half of the furfural produced was vented and the other half drained. The quantity of furfural detected in the wet fraction of the prehydrolysate represents less than 10% of the total furfural produced.

A ratio of 2:1 of furfural over acetic acid was observed in the vented steam and the liquid drained during the cook. This ratio was 1:3 in the wet fraction of corn cob prehydrolysates.

No HMF was detected in the vented steam, drained liquid and a concentration close to the limit of detection was observed in the wet fraction of corncobs prehydrolysates.

A lot of bubbling, foaming and the formation of a kind of fume were observed on the surface of the 12° C. to 30° C. condensed samples. It is believed that it comes from the production of carbon dioxide and hydrogen gas.

What is claimed is:

1. A process for pretreatment of a lignocellulosic biomass, comprising the steps of:
    exposing the lignocellulosic biomass to steam in an exposing step in a treatment vessel at a temperature of 190 to 220 degrees C. and an elevated pressure for an exposure time of 5 to 15 minutes; and
    purging volatile inhibitory compounds from the treatment vessel after having reached a pressure of 50 to 200 psig and for a duration of 20 to 600 seconds, and purging liquid inhibitory compounds after a delay of 60 seconds following pressurization, and for a duration of 380 seconds; and
    wherein the treatment vessel has a volatiles purge device including a valve that is selectively openable to permit flow at a controlled rate for a controlled duration of time, the volatiles purge device is located on the treatment vessel at a vertical position on the vessel above a level of the lignocellulosic biomass and the liquid compounds within the vessel, and the volatile compounds are removed through the volatiles purge device.

2. The process of claim 1, wherein the volatile compounds and/or liquid compounds are removed from the treatment vessel during the exposing step.

3. The process of claim 1, wherein the volatile compounds and the liquid compounds are purged from the vessel after the exposing step.

4. The process of claim 1, wherein the exposing step is carried out in a reaction vessel with a charge of lignocellulosic material and the volatile compounds are removed from a space above the charge of lignocellulosic material.

5. The process of claim 1, wherein the treatment vessel has a liquid purge device including a valve that is selectively openable to permit flow at a controlled rate for a controlled duration of time, the liquid purge device is located on the treatment vessel at a vertical position which permits removal of the liquid compounds in the treatment vessel, and the liquid compounds are removed through the liquid purge device.

6. The process of claim 1, wherein the exposing step is carried out at a temperature of 205 degrees C., a pressure of 235 psig and for a time interval of 8 minutes.

7. The process of claim 6, wherein the removal of the volatile compounds is carried out after the reaction vessel has reached 100 psig, and for a duration of 120 seconds.

8. The process of claim 1, wherein the lignocellulosic biomass is corncob.

9. The process of claim 8, wherein the corncob is ground to a particle size of 0.5 to 1.0 cm$^3$ prior to the exposing step.

10. The process of claim 1, wherein the volatile inhibitory compounds and the liquid inhibitory compounds are selected from the group consisting of lignin, acetic acid, hemicellulose and hemicellulose degradation products.

11. A process for pretreatment of a lignocellulosic biomass for the generation of cellulose to be used in the production of ethanol through hydrolysis and fermentation in a cellulosic ethanol production process, the process for pretreatment comprising the steps of:

exposing the lignocellulosic biomass to steam in an exposing step in a treatment vessel at a temperature of 190 to 220 degrees C., at an elevated pressure and for an exposure time of 5 to 15 minutes; and purging liquid and volatile inhibitory compounds, which are inhibitory to the hydrolysis and fermentation and are generated during the pretreatment of the lignocellulosic biomass, from the treatment vessel, the purging of the liquid inhibitory compounds being carried out after a delay of 60 seconds following pressurization of the treatment chamber and for a duration of 380 seconds, and the purging of the volatile inhibitory compounds being carried out after having reached a pressure of 50 to 200 psiq and for a duration of 20 to 600 seconds; the treatment vessel having a liquid purge device including a valve that is selectively openable to permit flow at a controlled rate for a controlled duration of time, and a volatiles purge device including a valve that is selectively openable to permit flow at a controlled rate for a controlled duration of time; the liquid purge device being located on the treatment vessel at a vertical position which permits removal of the liquid compounds in the treatment vessel, and the liquid compounds are removed through the liquid purge device; and the volatiles purge device being located on the treatment vessel at a vertical position on the vessel above a level of the lignocellulosic biomass and the liquid compounds within the vessel, and the volatile compounds are removed through the volatiles purge device.

12. The process of claim 11, wherein the volatile compounds and/or liquid compounds are removed from the treatment vessel during the exposing step.

13. The process of claim 11, wherein the volatile compounds and the liquid compounds are purged from the vessel after the exposing step.

14. The process of claim 11, wherein the exposing step is carried out at a temperature of 205 degrees C., a pressure of 235 psig and for a time interval of 8 minutes.

15. The process of claim 14, wherein the removal of the volatile compounds is carried out after the reaction vessel has reached 100 psig, and for a duration of 120 seconds.

16. The process of claim 11, wherein the lignocellulosic biomass is corncob.

17. The process of claim 16, wherein the corncob is ground to a particle size of 0.5 to 1.0 cm³ prior to the exposing step.

18. The process of claim 11, wherein the inhibitory volatile compounds and/or the liquid compounds are selected from the group consisting of lignin, acetic acid, hemicellulose and hemicellulose degradation products.

19. A process for pretreatment of a lignocellulosic biomass, comprising the steps of:

exposing the lignocellulosic biomass to steam in an exposing step in a treatment vessel at an elevated temperature of 190 to 220 degrees C. and an elevated pressure for an exposure time of 5 to 15 minutes;

purging volatile inhibitory compounds from the treatment vessel after having reached a pressure of 50 to 200 psig in the treatment vessel and for a duration of 20 to 600 seconds; and purging liquid inhibitory compounds after a delay of 60 seconds following pressurization, and for a duration of 380 seconds;

wherein the volatile compounds are removed from the treatment vessel during the exposing step; and wherein the treatment vessel has a volatiles purge device including a valve that is selectively openable to permit flow at a controlled rate for a controlled duration of time and a liquid purge device including a valve that is selectively openable to permit flow at a controlled rate for a controlled duration of time, the volatiles purge device being located on the treatment vessel at a vertical position on the vessel above a level of the lignocellulosic biomass and the liquid compounds within the vessel, and the volatile compounds are removed through the volatiles purge device and the liquid purge device being located on the treatment vessel at a vertical position which permits removal of the liquid compounds in the treatment vessel, and the liquid compounds are removed through the liquid purge device.

20. The process of claim 19, wherein the volatile compounds are further purged from the vessel after the exposing step.

21. The process of claim 19, wherein the exposing step is carried out at a temperature of 205 degrees C., a pressure of 235 psig and for a time interval of 8 minutes.

22. The process of claim 21, wherein the removal of the volatile compounds is carried out after the reaction vessel has reached 100 psig, and for a duration of 120 seconds.

23. The process of claim 19, wherein the lignocellulosic biomass is corncob.

24. The process of claim 23, wherein the corncob is ground to a particle size of 0.5 to 1.0 cm³ prior to the exposing step.

25. The process of claim 19, wherein the inhibitory volatile compounds and/or the liquid compounds are selected from the group consisting of lignin, acetic acid, hemicellulose and hemicellulose degradation products.

* * * * *